(12) United States Patent
Zhang

(10) Patent No.: US 9,769,937 B2
(45) Date of Patent: Sep. 19, 2017

(54) DISPLAY MODULE AND DISPLAY DEVICE HAVING THE DISPLAY MODULE

(71) Applicant: Shenzhen China Star Optoelectronics Technology Co., Ltd., Shenzhen, Guangdong (CN)

(72) Inventor: Yanxue Zhang, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 261 days.

(21) Appl. No.: 14/423,116

(22) PCT Filed: Jan. 6, 2015

(86) PCT No.: PCT/CN2015/070207
§ 371 (c)(1),
(2) Date: Feb. 21, 2015

(87) PCT Pub. No.: WO2016/090720
PCT Pub. Date: Jun. 16, 2016

(65) Prior Publication Data
US 2016/0345445 A1 Nov. 24, 2016

(30) Foreign Application Priority Data
Dec. 10, 2014 (CN) .......................... 2014 1 0758085

(51) Int. Cl.
*H05K 5/00* (2006.01)
*G02F 1/1335* (2006.01)
*G02F 1/1333* (2006.01)

(52) U.S. Cl.
CPC ..... *H05K 5/0017* (2013.01); *G02F 1/133504* (2013.01); *G02F 1/133512* (2013.01);
(Continued)

(58) Field of Classification Search
CPC .................................................. G02F 1/133512
See application file for complete search history.

(56) References Cited

U.S. PATENT DOCUMENTS

2007/0200975 A1* 8/2007 Kamijima ............. G02F 1/1303
349/95
2010/0315570 A1* 12/2010 Mathew ................ G06F 1/1637
349/58

(Continued)

FOREIGN PATENT DOCUMENTS

CN 104036696 A 9/2014

*Primary Examiner* — Dennis Y Kim
(74) *Attorney, Agent, or Firm* — Andrew C. Cheng

(57) ABSTRACT

The disclosure is related to a display module comprising a display panel and a cover. The display panel includes a black baffle frame defining a display region on the display panel. The cover is disposed on the display panel, and a side portion of the cover is on the black baffle frame. The display module further includes a visible region extension member disposed between the side portion of the cover and the black baffle frame. The disclosure further discloses a display device having the display module. In the disclosure, a bright region is formed on the black baffle frame at the periphery of the display region, and the bright region and the display region connect with each other as a whole to form an integrated screen such that viewers visually feel that the border of the display device is narrowed and the visible region of the screen is extended.

2 Claims, 1 Drawing Sheet

(52) U.S. Cl.
CPC ............... *G02F 1/133524* (2013.01); *G02F 2001/133331* (2013.01)

(56) References Cited

U.S. PATENT DOCUMENTS

| | | | | |
|---|---|---|---|---|
| 2013/0271957 A1* | 10/2013 | Etienne | ............. | G02F 1/133308 362/97.1 |
| 2014/0042406 A1* | 2/2014 | Degner | ................ | H01L 27/326 257/40 |
| 2014/0253606 A1* | 9/2014 | Yun | ..................... | G02B 5/0278 345/690 |
| 2016/0343308 A1* | 11/2016 | Hasegawa | ......... | G02F 1/133308 |

\* cited by examiner

DISPLAY MODULE AND DISPLAY DEVICE HAVING THE DISPLAY MODULE

BACKGROUND

Technical Field

The disclosure is related to display technology field, and more particular to a display module and a display device having the display module.

Related Art

Currently, with increasing quality requirement on mart mobile phones, and tablets (Pad) etc., display modules having features of narrow borders or high screen-to-body ratio have become main streams for the design on these products.

FIG. 1 is a cross-section view of a display device of the prior art. Refer to FIG. 1, the display device comprises a display module 110, a backlight module 120 disposed oppositely to the display module 110, and a frame 130 for securing the display module 110 and the backlight module 120 together. The display module comprises a display panel 111 and a cover 112. The display panel 111 comprises a black baffle frame 113. The black baffle frame 113 defines a display region on the display panel 111. The cover 112 is disposed on the display panel 111, and the side portion of the cover 112 is disposed on the black baffle frame 113. It is seen from FIG. 1 that in the design of the current display module the black baffle frame defining a display region on the display panel is necessary. However, the existence of the black baffle frame results in increase of the border of the display module and decrease of the screen-to-body ratio of the display module.

SUMMARY

In order to solve the problem existing in the current technology, one embodiment of the disclosure provides a display module comprising a display panel and a cover. The display panel comprises a black baffle frame defining a display region on the display panel. The cover is disposed on the display panel. The side portion of the cover is on the black baffle frame. The display module further comprises a visible region extension member disposed between the side portion of the cover and the black baffle frame.

In another embodiment, the visible region extension member is close to the display region.

In another embodiment, the side portion of the cover is provided with an assembly socket. The shape of the assembly socket matches with the shape of the visible region extension member. The visible region extension member is assembled in the assembly socket.

In another embodiment, the visible region extension member is a prism having a triangular cross-section.

In another embodiment, the visible region extension member is an illuminant having a rectangular cross-section.

In another embodiment, the side portion of the cover is provided with an assembly socket; wherein the cross-section of the assembly socket is triangular, and the prism having a triangular cross-section is assembled in the assembly socket.

In another embodiment, the side portion of the cover is provided with an assembly socket; wherein the cross-section of the assembly socket is rectangular, and wherein the illuminant having a rectangular cross-section is assembled in the assembly socket.

In yet another embodiment, the disclosure further provides a display device comprising the display module as stated above and a backlight module arranged oppositely to the display module, the backlight module providing light to the display module.

The display module and the display device having the display module have a bright region formed on the black baffle frame at the periphery of the display region and the bright region and the display region connect with each other as a whole to form an integrated screen such that viewers visually feel that the border of the display device is narrowed and the visible region of the screen is extended.

BRIEF DESCRIPTION OF THE DRAWINGS

The above and other exemplary aspects, features and advantages of certain exemplary embodiments of the present disclosure will be more apparent from the following description taken in conjunction with the accompanying drawings, in which.

DETAILED DESCRIPTION

The following description with reference to the accompanying drawings is provided to explain the exemplary embodiments of the disclosure. It will be apparent, however, that the disclosure may be practiced by one or more embodiments, and the specific embodiments provided herein cannot be interpreted to limit the disclosure. On the contrary, those embodiments are provided to explain the principle and the application of the disclosure such that those skilled in the art may understand the various embodiments of the disclosure and the various modifications for specific expected application.

Figure 2:
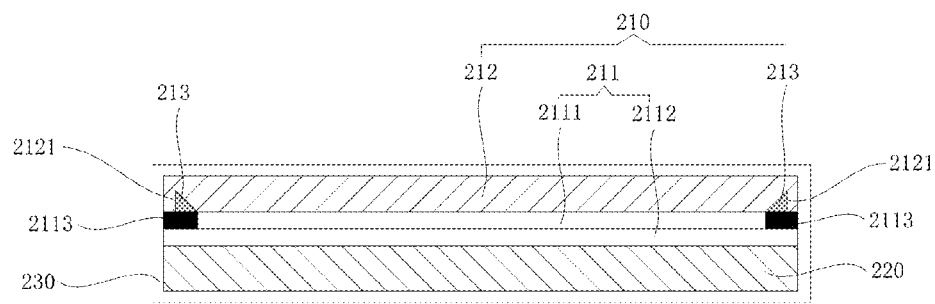
FIG. 2 is the cross-section view of the display device according to the embodiment of the disclosure.

FIG. 2 is the cross-section view of the display according to the embodiment of the disclosure.

Refer to FIG. 2, the display device according to the embodiment of the disclosure comprises a display module 210, a backlight module 220 and a frame 230. The display module 210 is disposed on the backlight module 220. The frame 230 is disposed at the periphery of the display module 210 and the backlight module 220. The frame 230 secures the display module 210 and the backlight module 220 together.

In the embodiment of the disclosure, the backlight module 220 may comprises a light source (such as light emitting diodes), a light guiding plate, and a back plate, etc. However, the specific structure of the backlight module 220 according to the embodiment of the disclosure may refer to the specific structure of the backlight module of the current technology. Thus, the specific structure of the backlight module 220 according to the embodiment of the disclosure is not described in details herein.

The display module 210 according to the embodiment of the disclosure is described in details in the following.

The display module 210 according to the embodiment comprises a display panel 211, a cover 212 and a triangular prism 213.

Figure 1:
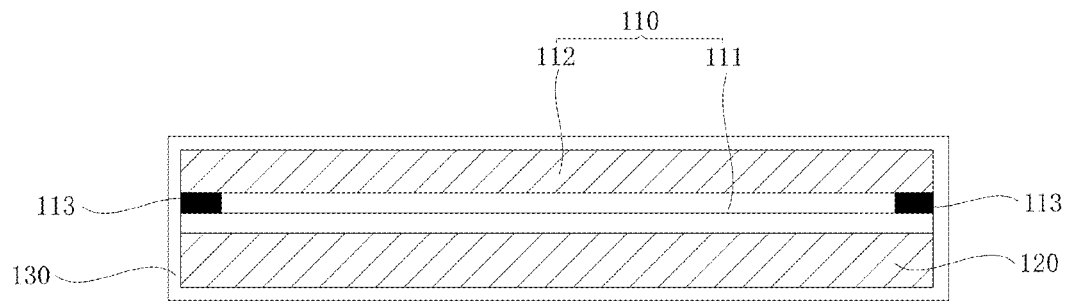
FIG. 1 is a cross-section view of a display device of the prior art.

Specifically, the display panel 211 comprises an upper substrate 2111 and a lower substrate 2112 cell-assembled with the upper substrate 2111. The two sides of the lower substrate 2112 in the width direction and the two sides of the lower substrate 2112 in the length direction exceed the upper substrate 2111. The display panel of the disclosure is not limited to the structure shown in FIG. 1. The display panel 211 comprises a black baffle frame 2113. The side portion of the power substrate 2112 exceeding the upper substrate 2111 is used to hold the black baffle frame 2113. In such manner, the black baffle frame 2113 defines a display region on the display panel 211 from overall view of the display panel 211. According to one embodiment of the disclosure, the display region coincides with the upper substrate 2111. However, the present invention is not limited thereto.

In order to protect the display panel 211, the cover is disposed on the display panel 211, and the side portion of the cover 212 is disposed on the black baffle frame 2113. According to the embodiment of the disclosure, the cover 212 may be made by a transparent glass material.

According to the embodiment of the disclosure, a triangular prism 213 having a triangular cross-section is used as the visible region extension member and is disposed between the side portion of the cover 212 and the black baffle frame 2113. In one embodiment, the triangular prism 213 is close to the display region. That is the triangular prism 213 is close to the upper substrate 2111. It should be noted that the term "close" herein indicates that one side of the triangular prism 213 touches with one side of the upper substrate 2111, or indicates that there is a very small gap between one side of the triangular prism 213 and one side of the upper substrate 2111. The very small gap is formed in such manner that viewers will not feel the presence of the black border when viewing the display device.

The triangular prism 213 is specifically secured as follows. The side portion of the cover 212 is provided with an assemble socket 2121. The shape of the assembly socket 2121 matches with the shape of the triangular prism 213. That is the shape of the cross section of the assemble socket 2121 and the shape of the cross section of the triangular prism 213 are the same triangular. The triangular prism 213 is assembled in the corresponding assembly socket 2121 to complete securing the triangular prism 213.

In this way, when the display panel 211 displays an image, the light from the display panel 211 illuminates the triangular prism 213. The triangular prism 213 refracts the light upward (toward the direction of the viewer). And the bright region formed by the refracted light connects with the display region as a whole to form an integrated screen such that viewers visually feel that the border of the display device is narrowed and the visible region of the screen is extended.

Figure 3:
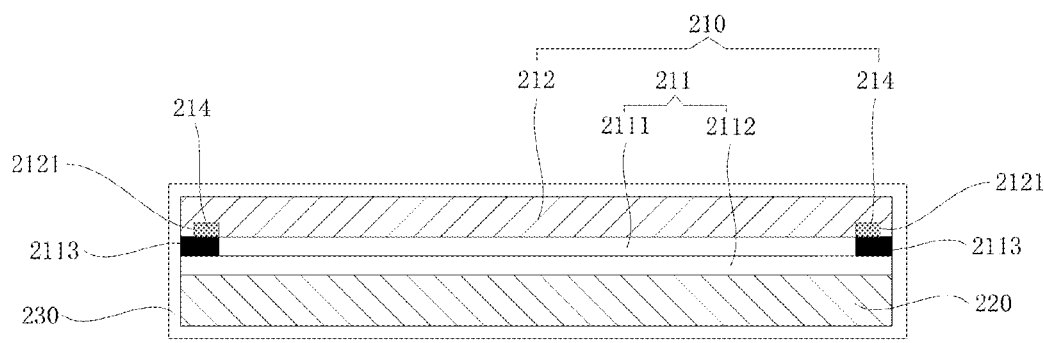
FIG. 3 is the cross-section view of the display device according to another embodiment of the disclosure.

FIG. 3 is the cross-section view of the display device according to another embodiment of the disclosure.

The description for the display device of FIG. 3, which is similar to the description for the display device of FIG. 2, will be omitted. Only the difference from the display device of FIG. 2 is described. Refer to FIG. 3, the difference between the display device according to another embodiment of the disclosure and the display device of FIG. 2 lies in that an illuminant 214 having a rectangular cross-section is used as the visible region extension member. The illuminant 214 is disposed between the side portion of the cover 212 and the black baffle frame 2113.

The illuminant 214 is specifically secured as follows. The side portion of the cover 212 is provided with an assemble socket 2121. The shape of the assembly socket 2121 matches with the shape of the illuminant 214. That is the shape of the cross section of the assemble socket 2121 and the shape of the cross section of the illuminant 214 are the same rectangular. The illuminant 214 is assembled in the corresponding assembly socket 2121 to complete securing the illuminant 214. In another embodiment of the disclosure, the illuminant 214 may be light emitting diodes. However, the present invention is not limited thereto.

In this way, when the display panel 211 displays an image, the illuminant 214 also generates lights. And the bright region formed by the generated light connects with the display region as a whole to form an integrated screen such that viewers visually feel that the border of the display device is narrowed and the visible region of the screen is extended.

It should be noted that the visible region extension member is not limited to the triangular prism 213 as shown in FIG. 2 and the illuminant 214 shown in FIG. 3. Any appropriate optical element that may expand the lights form the display panel may be used as the visible region extension member.

Although the present disclosure is illustrated and described with reference to specific embodiments, those skilled in the art will understand that many variations and modifications are readily attainable without departing from the spirit and scope thereof as defined by the appended claims and their legal equivalents.

What is claimed is:

1. A display module, comprising:
    a display panel having a black baffle frame defining a display region on the display panel; and
    a cover disposed on the display panel, a side portion of the cover on the black baffle frame;
    wherein the display module further comprises a visible region extension member disposed between the side portion of the cover and the black baffle frame;
    wherein the visible region extension member is an illuminant being self-emissive and configured for generating light when the display panel displays an image;
    wherein the visible region extension member is close to the display region;
    wherein the illuminant has a rectangular cross-section and is light emitting diodes;
    wherein the side portion of the cover is provided with an assembly socket; the cross-section of the assembly socket is rectangular, and the illuminant having a rectangular cross-section is assembled in the assembly socket.

2. A display device, comprising:
    a display module; and
    a backlight module arranged oppositely to the display module, the backlight module providing light to the display module;
    wherein the display module comprises:
        a display panel having a black baffle frame defining a display region on the display panel; and
        a cover disposed on the display panel, a side portion of the cover on the black baffle frame;
        wherein the display module further comprises a visible region extension member disposed between the side portion of the cover and the black baffle frame;
        wherein the visible region extension member is an illuminant being self-emissive and configured for generating light when the display panel displays an image;
        wherein the visible region extension member is close to the display region;
        wherein the illuminant has a rectangular cross-section and is light emitting diodes;
        wherein the side portion of the cover is provided with an assembly socket; the cross-section of the assembly socket is rectangular, and the illuminant having a rectangular cross-section is assembled in the assembly socket.

* * * * *